(12) United States Patent
Janhunen

(10) Patent No.: US 7,484,386 B2
(45) Date of Patent: Feb. 3, 2009

(54) METHOD AND APPARATUS FOR CONTROLLING A TREATMENT PROCESS IN SAFETY GLASS PRODUCTION

(75) Inventor: Toivo Janhunen, Kangasala (FI)

(73) Assignee: Glaston Services Ltd. OY, Tampere (FI)

( * ) Notice: Subject to any disclaimer, the term of this patent is extended or adjusted under 35 U.S.C. 154(b) by 100 days.

(21) Appl. No.: 11/282,470

(22) Filed: Nov. 21, 2005

(65) Prior Publication Data

US 2006/0107694 A1 May 25, 2006

(30) Foreign Application Priority Data

Nov. 22, 2004 (FI) ................................. 20045452

(51) Int. Cl.
*C03B 9/41* (2006.01)
(52) U.S. Cl. ................... 65/29.11; 65/104; 65/106; 65/114; 65/287; 65/349; 219/388; 219/400; 219/411; 219/518
(58) Field of Classification Search ............... 65/114, 65/29.12, 29.14, 29.1, 104
See application file for complete search history.

(56) References Cited

U.S. PATENT DOCUMENTS 3,717,449 A * 2/1973 Seymour .................. 65/104

FOREIGN PATENT DOCUMENTS

| EP | 0 282 947 A1 | 9/1988 |
|---|---|---|
| EP | 0 776 865 A1 | 6/1997 |
| FI | 93203 B | 1/1992 |
| FI | 100526 B2 | 11/1997 |
| FI | 106256 B | 8/1999 |
| FI | 20030005 A | 7/2004 |
| WO | WO 97/44286 A1 | 11/1997 |
| WO | WO 2004/080905 A1 | 9/2004 |

* cited by examiner

*Primary Examiner*—Philip C Tucker
*Assistant Examiner*—Phu H Nguyen
(74) *Attorney, Agent, or Firm*—Buchanan Ingersoll & Rooney PC

(57) ABSTRACT

The invention relates to a method and apparatus for controlling a treatment process in safety glass production by means of information representing a load of glass panels. Flat glass panels are conveyed through a heating lehr (2) and a quenching section (22). The treatment process is preceded by using a line camera (6) for reading the information representing a load of glass. This information is used in controlling the treatment process. The load-representing information is supplemented by automated detection of a glass panel's coating or the absence of coating. A glass panel's thickness is also measured. This information about coating and thickness is used in quenching for automated regulation of a quenching time and a blast pressure. Such information is also particularly useful for the automated control of convection heating (3c) included in the heating device.

10 Claims, 2 Drawing Sheets

METHOD AND APPARATUS FOR CONTROLLING A TREATMENT PROCESS IN SAFETY GLASS PRODUCTION

The invention relates to a method for controlling a treatment process in safety glass production by means of information representing a load of glass panels, said method comprising conveying flat glass panels through a heating lehr and a quenching section and, prior to a treatment process, reading information representing a load of glass panels, which is used in controlling the treatment process.

The invention relates also to an apparatus for controlling a treatment process in safety glass production by means of information representing a load of glass panels, said apparatus comprising a lehr, heating units in the lehr for heating glass panels for a tempering process, a quenching section provided with nozzle-equipped quenching air blast boxes above and below glass panels, a loading table, a roll conveyor for carrying glass panels from the loading table through the lehr and the quenching section, and a detector above or below the conveyor for reading information representing a load of glass panels.

According to a particular application, the information representing a load of glass panels includes at least one of the following: shape, size, location, coating (coated or uncoated), and thickness. The load contains several pieces of glass simultaneously, typically both successively and side by side.

This type of method and apparatus are known from the Applicant's international patent application WO 2004/080905 A1. The method described therein has proved useful both in heating control and production tracking.

It is an object of this invention to develop this prior known method and apparatus further to make it even more versatile and effective in its adaptation to the automation of an entire tempering process.

This object is accomplished by means of methods set forth in the independent claims 1 and 5. The object is also accomplished by means of an apparatus as defined in the independent claim 10. The dependent claims disclose preferred embodiments of the invention.

Figure 1:
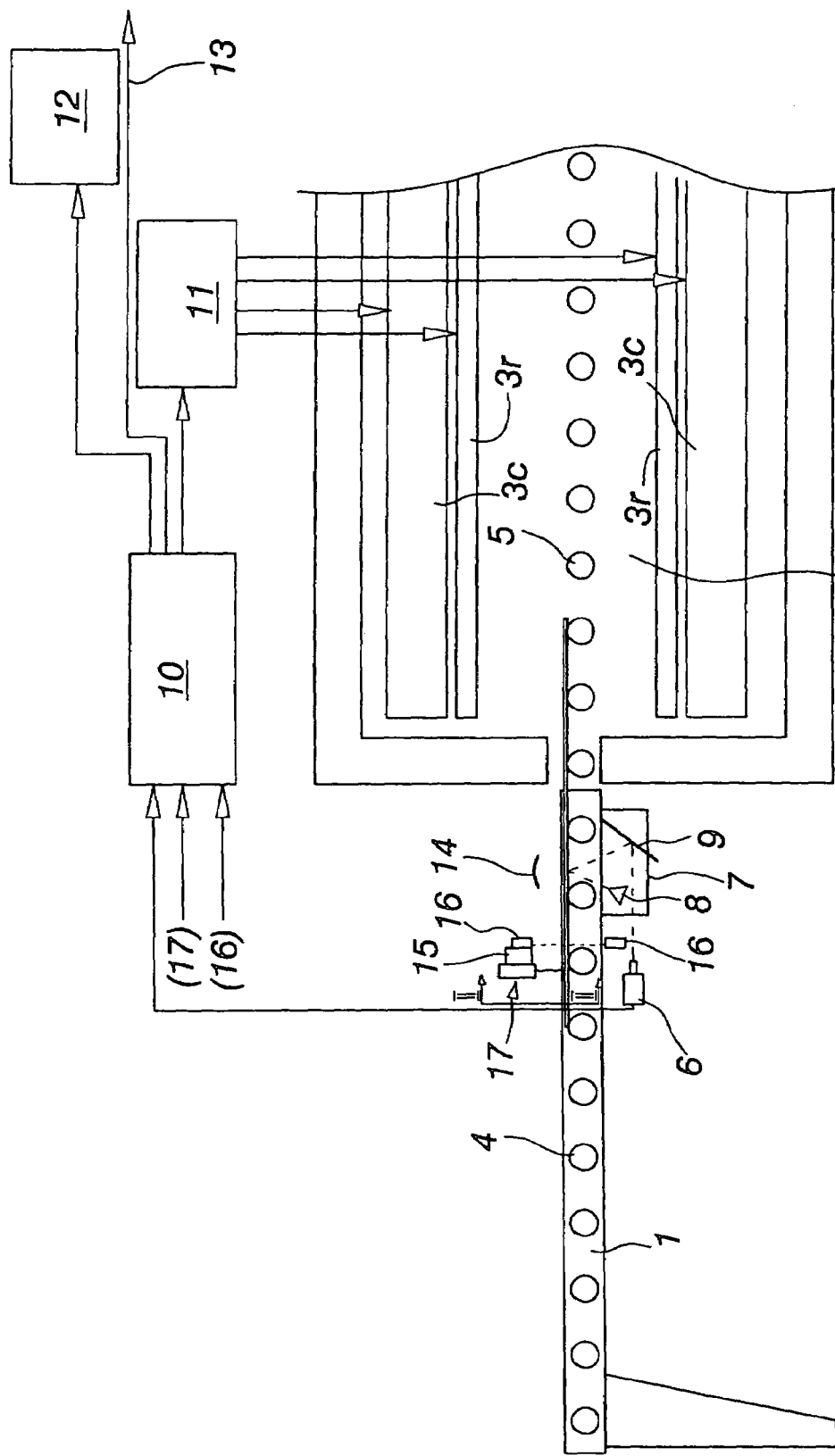
Figure 2:
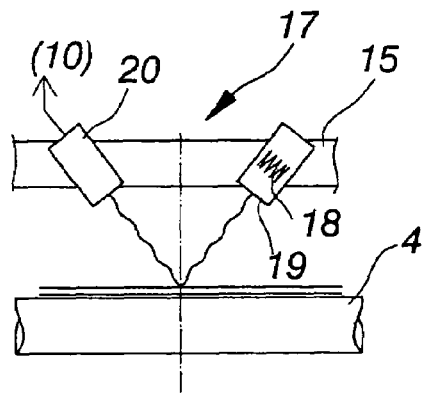
Figure 3:
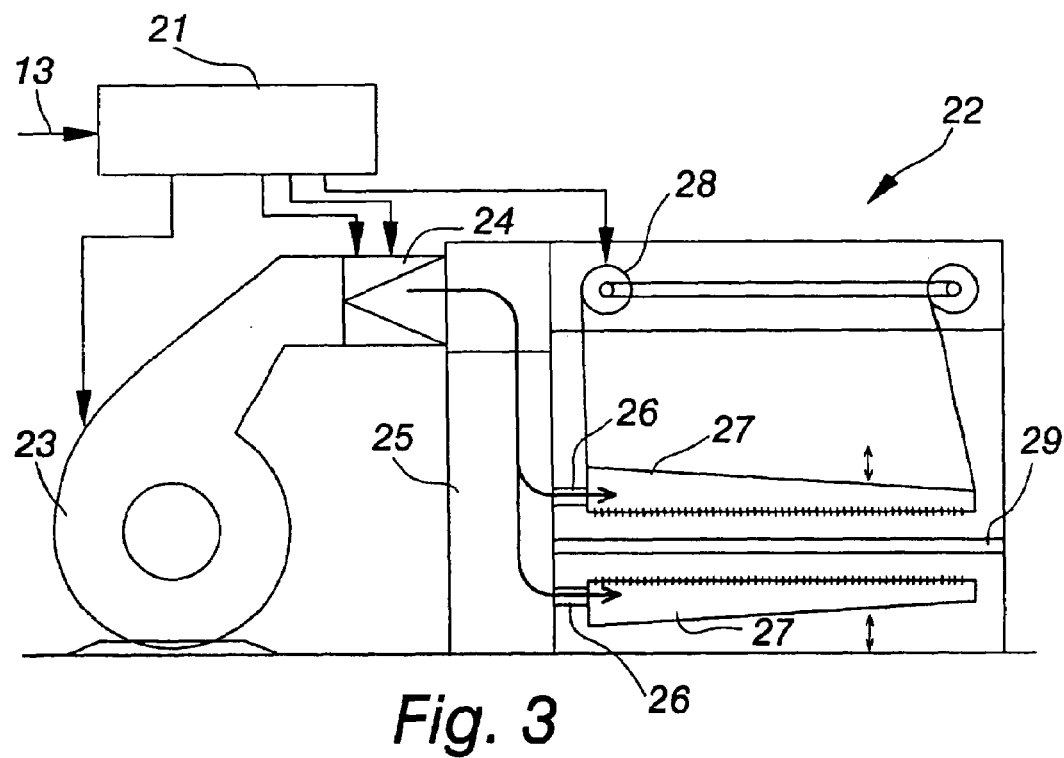

One exemplary embodiment of the invention will now be described in more detail with reference to the accompanying drawings, in which FIG. 1 shows in a schematic longitudinal section an upstream end for a tempering lehr equipped with an apparatus implementing the inventive method, FIG. 2 shows a fragmentary enlargement taken along a section line II-II in FIG. 1, and FIG. 3 shows a schematic cross-section through a quenching section having its operation controlled automatically by the inventive method and apparatus.

Flat glass panels to be tempered are placed on a conveyor constituted by a loading table's 1 rolls 4 for conveying a glass load into a lehr 2 and onto a conveyor constituted by rolls 5 therein. The glass panels have a desired size and shape to determine the number and placement thereof in each load. In addition, the glass panels have a certain thickness and can be coated (low-E) or uncoated. Heating of a glass load in the lehr is effected e.g. by means of electrical resistances 3r and convection heating elements 3c, which can be ducts or boxes with jet orifices. In the illustrated case, the heating elements 3r and 3c extend lengthwise of the lehr for creating a desired lateral heating profile. The heating elements 3r and 3c can also be divided in segments lengthwise of the lehr for delivering different heating effects also e.g. to the lehr's end and central regions.

A quenching section 22 shown in FIG. 3 is provided with one or more fans 23, which is or are connected by a blast duct to an air distribution chamber 25 that is connected by supply ducts 26 to nozzle boxes 27, the glass panels to be tempered being conveyed therebetween on rolls 29. The regulation of blast pressure to the nozzle boxes 27 is effected e.g. by means of paddle adjusters associated with the fans 23 and by means of dampers 24 associated with the blast ducts, the latter being described in more detail in the Applicant's patent U.S. Pat. No. 4,891,056. Other types of pressure control equipment can also be used and the foregoing is only referred to by way of example for a skilled person to practice the invention. In addition, the quenching section includes power units 28 for adjusting the nozzle boxes' 27 distance from a conveying plane defined by the conveyor rolls 29. Operation of the fans 23, adjusters 24 and power units 28 is controlled by a control and regulation unit 21, which is provided with control parameters of the invention as described hereinbelow.

For the control of both heating and quenching, and for other subsequently described purposes as well, it is useful to learn load-representing information as comprehensively as possible, especially a load rate, the locations, shapes and sizes of glass panels, as well as the thickness of glass panels and the presence of a possible coating. Therefore, the loading table 4 is accompanied by three separate detecting and measuring devices, which are described in more detail as follows. Fitted in a housing 7 underneath the loading table's 1 conveyor 4 are high intensity light sources 8 for illuminating the bottom surface of a glass load through a gap between the rolls 4. The propagation direction of light reflected from the bottom surface (and possibly from the top surface as well) of glass is deflected by a mirror 13 towards a line camera 6, which is placed sufficiently far away from the point of reflection to enable one or just a few line cameras 6 to cover the conveyor's entire width. Since the line camera 6 is also placed underneath the loading table 1, there will be no structures above the table 1 which would be interfering or should be protected. Above the illuminated inter-roll gap is nevertheless a screen or backdrop 14 with a non-reflecting, preferably black matte bottom surface. The light source 8 may comprise a row of LEDs extending across the entire width of the conveyor. Thus, the length of a light source is not limited to the length of available tubular lamps.

While a glass load is advancing on the conveyor 4, the conveyor pulses can be synchronized to the line frequency of the camera 6 for providing dense dot matrix information about an area or areas containing glass.

The load-related information is passed from the camera 6 to a control device 10 for further processing this information in various ways. In the invention, this information is principally used for controlling the heating elements 3r and 3c and for providing heating profiles which match the load pattern as precisely as possible.

The lateral evaluation of heating demand is performed by checking which heating elements (which lanes) have glass thereunder and which heating elements do not have glass thereunder. The required heating effects are worked out by a desired equation for creating a desired lateral heating profile. This enables a virtually real-time response to heating demand and an improved thermal equilibrium for the lehr. This applies particularly to convection heating which provides a response to heating demand more quickly than radiation heating.

Load pattern measurement can also be utilized for identification of broken glasses and for sorting glasses destined to various customers. An image of the loading conveyor 1, 4 is displayed on a monitor 12 in the vicinity of an unloading conveyor to the operator who is able to visually detect a possible absence of glass.

If the size and shape of glass are known, the glass can be identified and labels can be printed for the unloading-end operator for attachment to the glasses (customer and glass data). The identification of glasses can be linked to a bar code which enables a subsequent tracking as to when and at which process setups the glass has passed through the process. This is a source of useful feedback information for production tracking or for checking process control parameters.

In view of supplementing load-representing information, the inventive apparatus includes a bilateral distance or thickness gauge 16 for measuring the thickness of a glass panel and a detector 17-20 for detecting a coating. These are mounted on a crossbar 15 above the conveyor 4. The distance gauge 16 may consist e.g. of top-side and bottom-side ultrasonic sensors, which are at a fixed gap from each other and which measure a distance to the top and bottom surfaces of a glass panel. Thickness is obtained by deducting a sum of the distances from a total gap between the sensors. In principle, a single overhead distance gauge would be enough, but then the measuring accuracy would remain poor. An option is to employ a thickness gauge. There are already commercially available thickness gauges which can be used in this context as well.

FIG. 2 illustrates more specifically an example of the detector 17 for detecting a coating. An IR radiator 18 is provided with a heating resistance 19, the thermal radiation emitted thereby reflecting from glass surface more or less, depending on whether the glass is coated or not. A pyrometer 20 is used for monitoring the intensity of thermal radiation. When the intensity exceeds a given threshold value, the glass is coated and a message of that is supplied to the control device 10, said message being further transmitted in a suitable mode to a heater control unit 11 and to the quenching section control or regulation unit 21.

The information regarding a coating and/or glass thickness is used in quenching primarily for regulating a quenching time and a blast pressure in such a way that these become automatically adjusted as required by a type of coating and/or glass thickness. The U.S. Pat. No. 4,891,056 patent discloses an exemplary graph of a relationship between blast pressure and glass thickness. Thin glasses require a high pressure and a short quenching time.

Accordingly, a major advantage can be gained in the control of heating elements if the consideration of thickness and/or coating can be performed in an automated manner. When a glass panel is provided with a coating which has a poor take-up ability of thermal radiation, the top-side convection will be increased respectively for sustaining thermal equilibrium between top and bottom sides. The knowledge about glass thickness and a coating has also influence on the way of controlling bottom-side and top-side convection heating with respect to each other during a heating cycle.

The information about glass thickness and/or a coating can also be used in quenching for the adjustment of blasting distances by lifting or lowering the nozzle boxes 27. The information about glass thickness and/or a coating can also be used for the adjustment of mutual relationships between quenching air blasts on the top and bottom sides of glass panels. Proper adjustment setups can be worked out experimentally and the obtained adjustment graphs can be entered into the control units 11 and 21. Plenty of useful information about adjustment setups is indeed presently available as coated glasses, uncoated glasses and glasses of varying thicknesses have been tempered by manually entering the information regarding thickness and coating. With respect to this prior art, the situation will be different in the sense that the manual input of such information is no longer necessary, thus improving the process in terms of operating reliability as the possibility of human errors and mistakes in information input is eliminated.

The invention claimed is:

1. A method for controlling a treatment process in safety glass production by means of information representing a load of glass panels, said method comprising:
conveying flat glass panels through a heating lehr and a quenching section and, prior to a treatment process, reading information representing a load of glass panels, which is used in controlling the treatment process,
wherein, during production, the existance of a glass panel's coating is detected automatically and/or a glass panel's thickness is measured, and the information about the detected coating and/or measured thickness is used in quenching for automated regulation of a quenching time and the blast pressure of quenching air.

2. A method as set forth in claim 1, wherein the information about coating and/or thickness is used in quenching for the adjustment of blast distances.

3. A method as set forth in claim 1, wherein the information about coating and/or thickness is used in quenching for adjusting the mutual relationship between quenching air blasts on the top and bottom sides of glass panels.

4. A method as set forth in claim 1, wherein convection heating included in a heating device is controlled automatically on the basis of control parameters, including a detected coating and/or a measured thickness.

5. A method as set forth in claim 4, wherein the information representing a load is further read with at least one line camera, which is used for taking up slight background light radiation coming through the glass conveying plane, the substantial increase in its intensity, as light is reflected by glass, being interpreted as glass.

6. A method for controlling a treatment process in safety glass production by means of information representing a load of glass panels, said method comprising:
conveying flat glass panels through a heating lehr and a quenching section and, prior to a treatment process, reading information representing a load of glass panels, which is used in controlling the treatment process,
wherein, during production, the existance of a glass panel's coating is detected automatically and/or a glass panel's thickness is measured, and convection heating included in a heating device is controlled automatically on the basis of control parameters, including a detected coating and/or a measured thickness.

7. A method as set forth in claim 6, wherein the information representing a load is further read with at least one line camera, which is used for taking up slight background light radiation coming through the glass conveying plane, the substantial increase in its intensity, as light is reflected by glass, being interpreted as glass.

8. A method as set forth in claim 7, wherein high-intensity light is directed to the bottom surface of a glass panel, the light reflected therefrom being reflected by means of a mirror to a line camera below the conveyor plane, the information representing a load being read thereby and being used for controlling both radiation heating and convection heating.

9. A method as set forth in claim 7, wherein the information representing a load is utilized in heater control by performing the evaluation of heating effect lengthwise and/or crosswise of the lehr in real time upon the arrival of glass at a respective point of heating.

10. A method as set forth in claim 7, wherein the information representing a load is utilized for at least one of the following:
   (a) identification of glass panels
   (b) tracking production in a glass processing facility and recording information related to a production process, and
   (c) detection of glasses broken in the process.

* * * * *